United States Patent
Hodgson et al.

(10) Patent No.: US 9,594,792 B2
(45) Date of Patent: Mar. 14, 2017

(54) MULTIPLE PROCESSOR SYSTEM

(71) Applicant: STMicroelectronics (Research & Development) Limited, Marlow (GB)

(72) Inventors: Stuart Hodgson, Bristol (GB); Peter Stieglitz, Wootton Bassett (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 191 days.

(21) Appl. No.: 14/496,620

(22) Filed: Sep. 25, 2014

(65) Prior Publication Data

US 2015/0095701 A1    Apr. 2, 2015

(30) Foreign Application Priority Data

Sep. 30, 2013 (GB) .................... 1317239.0

(51) Int. Cl.
- *G06F 11/00* (2006.01)
- *G06F 17/30* (2006.01)
- *G06F 11/14* (2006.01)

(52) U.S. Cl.
CPC .... *G06F 17/30345* (2013.01); *G06F 11/1417* (2013.01); *G06F 11/1438* (2013.01); *G06F 11/1441* (2013.01); *G06F 17/30115* (2013.01); *G06F 17/30117* (2013.01)

(58) Field of Classification Search
CPC ............. G06F 11/1417; G06F 11/1438; G06F 11/1441; G06F 11/1456; G06F 11/1666
See application file for complete search history.

(56) References Cited

U.S. PATENT DOCUMENTS

| | | | | |
|---|---|---|---|---|
| 6,195,695 | B1 * | 2/2001 | Cheston | G06F 11/1417 707/999.2 |
| 6,473,856 | B1 * | 10/2002 | Goodwin | G06F 9/4401 713/2 |
| 7,210,033 | B1 * | 4/2007 | Mudusuru | G06F 11/1469 713/2 |
| 8,209,526 | B2 * | 6/2012 | Pierce | G06F 11/1666 713/1 |
| 2006/0143431 | A1 * | 6/2006 | Rothman | G06F 11/1417 713/2 |
| 2008/0155331 | A1 * | 6/2008 | Rothman | G06F 11/1417 714/36 |
| 2008/0161053 | A1 | 7/2008 | Hsieh | |
| 2013/0238882 | A1 * | 9/2013 | Suzuki | G06F 9/30043 712/228 |

FOREIGN PATENT DOCUMENTS

EP        2 172 843 A1    4/2010

* cited by examiner

*Primary Examiner* — Philip Guyton
(74) *Attorney, Agent, or Firm* — Seed IP Law Group LLP

(57) ABSTRACT

A method, data structure and computer program are provided. A file is stored in a first memory. A duplicate of at least a part of the file is stored in the first memory. A processor is reset based on the duplicate of at least a part of the file.

40 Claims, 6 Drawing Sheets

MULTIPLE PROCESSOR SYSTEM

BACKGROUND

Technical Field

This application relates to computer processing systems and in particular, but not exclusively, to the resetting of a computer system and/or processor.

Description of the Related Art

Computer processing systems typically include a central processing unit (CPU) associated with a volatile and non-volatile memory. The CPU may typically execute from the volatile memory. Instructions and data necessary for a CPU to start executing may be stored in the non-volatile memory and copied to the volatile memory from which the CPU may execute.

BRIEF SUMMARY

In an embodiment, a method comprises: storing a plurality of files in a first memory, each file of the plurality of files being associated with a respective processor of a multiprocessor system; for each file of the plurality of files, storing a duplicate of at least a part of the file in the first memory; and selectively resetting a processor of the multiprocessor system based on the duplicate of at least a part of the file associated with the processor. In an embodiment, at least one of the plurality of files is an image of a processor boot-up file stored in a second memory. In an embodiment, at least one of the plurality of files comprises data information and the data information is stored in a first section of the first memory. In an embodiment, the duplicate of at least a part of the at least one of the plurality of files comprises duplicate data information and is stored in a second section of the first memory. In an embodiment, the data information stored in the first section of the first memory is configured to be modified during the operation of the associated processor. In an embodiment, the second section of the first memory comprises read only memory. In an embodiment, the method comprises: updating the duplicate data information in the second section by overwriting the duplicate data information with the data information stored in the first section. In an embodiment, the duplicate data information is overwritten when it is determined that the data information in the first section has been modified without error. In an embodiment, the duplicate data information is overwritten periodically. In an embodiment, the method comprises: determining that the first section of the first memory associated with a respective processor has been modified in error; and resetting the associated processor based on the duplicate data information stored in the second section of the first memory. In an embodiment, resetting the associated processor comprises: overwriting the first section of the file with the data information stored in the second section; and resetting the associated processor using the overwritten file. In an embodiment, the data information comprises data register values for a respective associated processor. In an embodiment, the first memory is a volatile memory of the multiprocessor system. In an embodiment, the second memory is a non-volatile memory of the multiprocessor system. In an embodiment, the at least part of the file associated with a respective processor is duplicated such that recovery is possible from the duplicate of the at least first part of the file when the at least first part of the file has become corrupted by operation of the associated processor. In an embodiment, the duplicate of the at least part of the file associated with a respective processor is maintained in a valid state such that a system recovery may be based on the duplicate of the at least a part of the file. In an embodiment, a processor of the multiprocessor system is reset from a volatile memory. In an embodiment, a processor of the multiprocessor system manages access to sections of the first memory by processors of the multiprocessor system. In an embodiment, the method comprises restricting access to a section of the first memory storing a duplicate of at least a part of the file associated with a respective processor of the multiprocessor system to the associated processor.

In an embodiment, a system comprises: one or more volatile memories; and a plurality of processors, which, in operation: store a plurality of files in the one or more volatile memories, each file of the plurality of files being associated with a respective processor of the plurality of processors; for each file of the plurality of files, store a duplicate of at least a part of the file in the one or more volatile memories; and selectively reset a processor of plurality of processors based on the duplicate of at least a part of the file associated with the processor. In an embodiment, the system comprises a non-volatile memory, wherein at least one of the plurality of files is an image of a processor boot-up file stored in the non-volatile memory. In an embodiment, at least one of the plurality of files comprises data information and the data information is stored in a first section of a first volatile memory of the one or more volatile memories and the duplicate of at least a part of the at least one of the plurality of files comprises duplicate data information and is stored in a second section of the first volatile memory. In an embodiment, in operation, the data information stored in the first section of the first volatile memory is modified during the operation of the associated processor. In an embodiment, the second section of the first volatile memory comprises read only memory. In an embodiment, in operation, the duplicate data information in the second section is selectively overwritten with the data information stored in the first section. In an embodiment, when it is determined that the first section of the first volatile memory associated with a respective processor has been modified in error, the associated processor is reset based on the duplicate data information stored in the second section of the first volatile memory. In an embodiment, in operation, a processor of the plurality of processors manages access to sections of the one or more volatile memories by processors of the plurality of processors. In an embodiment, in operation, access to a section of the one or more volatile memories storing a duplicate of at least a part of the file associated with a respective processor of the plurality of processors is restricted to the associated processor. In an embodiment, the one or more processors are processing cores of a network-on-a-chip.

In an embodiment, a non-transitory computer-readable medium's contents cause a multiprocessor system to perform a method, the method comprising: storing a plurality of files in one or more volatile memories of the multiprocessor system, each file of the plurality of files being associated with a respective processor of the multiprocessor system; for each file of the plurality of files, storing a duplicate of at least a part of the file in the one or more volatile memories; and selectively resetting a processor of plurality of processors based on the duplicate of at least a part of the file associated with the processor. In an embodiment, at least one of the plurality of files is an image of a processor boot-up file stored in a non-volatile memory of the multiprocessor system. In an embodiment, the method comprises managing access to sections of the one or more volatile memories by processors of the multiprocessor system. In an embodiment, the managing access comprises restricting access to a section of the one or volatile memories storing a duplicate of at least a part of the file associated with a respective processor of the multiprocessor system to the associated processor.

According to a first aspect of the present application, there is provided a method comprising: storing a file in a first memory; storing a duplicate of at least a part of the file in the first memory; and resetting a processor based on the duplicate of at least a part of the file.

The file may be an image of a boot-up file stored in a second memory. The file may comprise data information and the data information is stored in a first section of the first memory. The duplicate of at least a part of the file may comprise duplicate data information and is stored in a second section of the first memory. The data information stored in the first section of the first memory may be configured to be modified during the operation of the processor. The second section of the first memory may comprise read only memory.

The method may further comprise: updating the duplicate data information in the second section by overwriting the duplicate data information with the data information stored in the first section. The duplicate data information may be overwritten when it is determined that the data information in the first section has been modified without error. The duplicate data information may be overwritten periodically.

The method may further comprise: determining that the first section of the first memory has been modified in error; and resetting the processor based on the duplicate data information stored in the second section of the first memory. Resetting the processor may comprise: overwriting the first section of the file with the data information stored in the second section; and resetting the processor using the file.

The data information may comprise data register values for the processor. The first memory may be a volatile memory of a processor system. The second memory may be a non-volatile memory of a processor system.

The at least part of the file may be duplicated such that system recovery is possible from the duplicate of the at least first part of the file when the at least first part of the file has become corrupted by operation of the processor. The duplicate of the at least part of the file may be maintained in a valid state such that a system recovery may be based on the duplicate of the at least a part of the file. System recovery may comprise resetting the processor. The processor may be reset from a volatile memory.

According to a second aspect, there is provided data structure stored in a machine readable memory comprising: a file; and a duplicate of at least a part of the file; wherein the duplicate of at least part of the file is suitable for a processor to be reset based on the duplicate of at least part of the file.

The file may be configured to be modifiable by the processor during operation of the processor. The duplicate of at least part of the file may be configured to be used to reset the processor when the file becomes corrupted.

According to a third aspect, there is provided a computer program embodied on a computer readable medium, said computer program configured to: store a file in a first memory; store a duplicate of at least a part of the file in the first memory; and wherein the duplicate of at least part of the file is suitable for a processor to be reset based on the duplicate of at least part of the file.

The file may be an image file of a boot-up file stored in a second memory and the computer program may be configured to store the file in the first memory such that at least part of the file is modifiable during operation of the processor.

BRIEF DESCRIPTION OF THE SEVERAL VIEWS OF THE DRAWINGS

Embodiments will now be described with reference to the following figures in which.

DETAILED DESCRIPTION

When a central processing unit (CPU) is reset, it may be desired to restore certain CPU registers to their initial values. This may allow a CPU to be reset to in initial operating state. In some systems this may be achieved by copying initialization instructions and data from a non-volatile memory to a volatile memory from which the processor may execute. Loading instructions from a non-volatile memory to volatile memory may increase an amount of time taken for the processor to reset.

Embodiments of the present application may relate to the resetting of a processor, for example a CPU. Some embodiments may relate to restoring instructions and data, used by the processor to begin execution, to their original values. This may be done, for example, in response to an error or other runtime anomaly experienced by the processor. In some embodiments, the instructions and data may correspond to a data structure such as an executable file, for example an executable-and-linkable (ELF) image file. In some embodiments, a .data section of a file may be restored to an original .data section.

In some embodiments, a memory associated with a processor may store instructions and data required by the processor to begin executing. The memory may additionally store a copy of a section of the instructions and data. For example, the instructions and data may correspond to an ELF image file and the section of which a copy is made may correspond to a .data section of the ELF image file.

Figure 1:
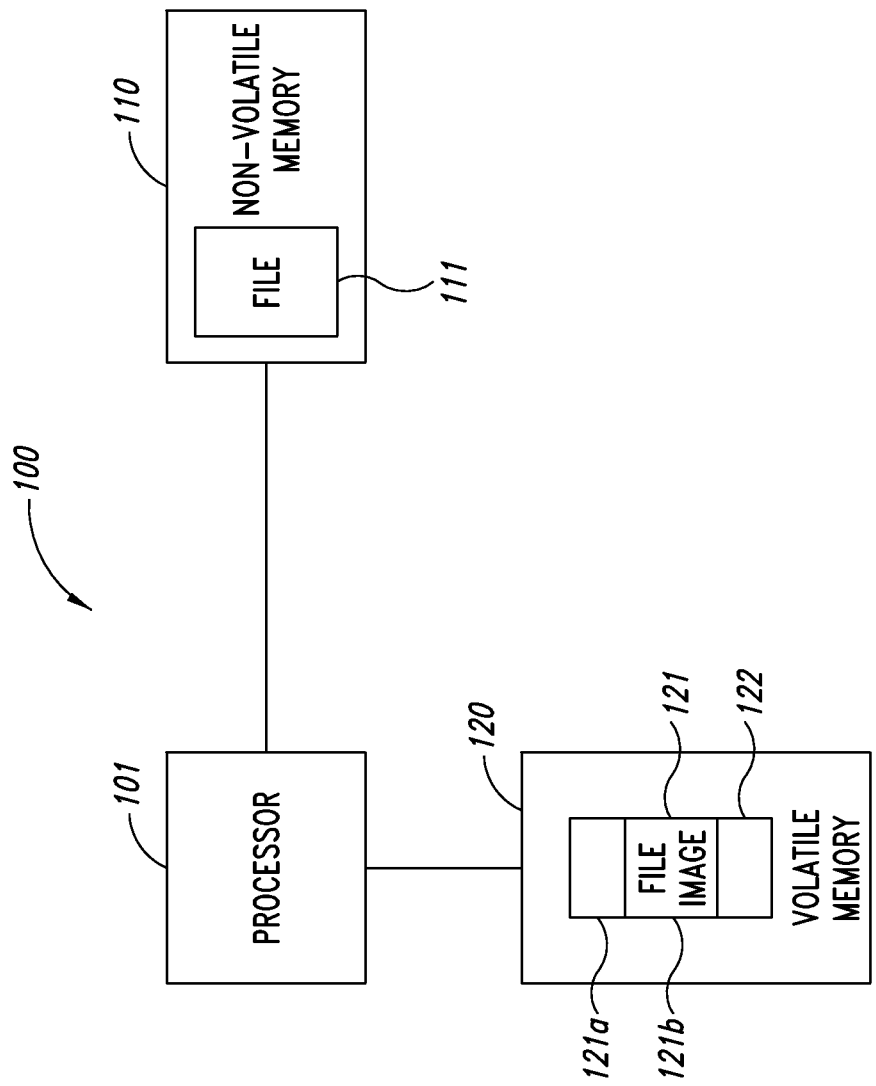
FIG. 1 shows a computer system in which embodiments may be implemented.

FIG. 1 shows an example of computer system in which some embodiments may be implemented. FIG. 1 comprises a processor 101, non-volatile memory 110 and volatile memory 120. It will be appreciated that the non-volatile memory 110 may be any suitable non-volatile memory, for example flash memory. It will similarly be appreciated that the volatile memory 120 may be any suitable volatile memory, for example double data rate (DDR) synchronous random access memory (SRAM).

The non-volatile memory 110 may store instructions and data necessary for the processor to start executing, for example a file 111. In some embodiments the file 111 may be an executable file, for example a file of executable-and-linkable (ELF) file format.

On boot-up, a copy (or image) 121 of the file 111 may be made and written to the volatile memory 120. In some embodiments, the image of the file 121 may contain read only data 121a and read and write accessible data 121b. It will be appreciated that any read only data 121a may be stored in a read-only memory area of the volatile memory 120 and any read and write accessible data 121b may be stored in a read and write accessible area of the volatile memory 120. It will be appreciated however that this is by way of example only and the image 121 may stored in a read and write accessible area of the volatile memory 120.

In this embodiment, one or more processors may execute from the volatile memory 120 and the file 111 may be copied into the volatile memory in order to give an associated processor access to the contents of the file 111.

During execution, data of the image 121 stored in the read and write accessible area of the volatile memory 120 may be accessed by the processor and may be changed by programs or applications (including threads and processes) running on the processor 101. For example the section 121b may contain default values used by the processor and these values may be changed during the operation of the processor.

During operation an internal error, for example where data in the memory 121b becomes corrupted, may occur. Additionally or alternatively the memory 120 may be accessible by other applications or processors and the data in the memory section 121b may become corrupted by the other processors. In these cases, it may be decided that the processor is to be reset.

For example, resetting the processor may be desired due to the detection of an internal error. This may be for example memory corruption, invalid operation such as a bug, and/or CPU bus lock ups. Alternatively, in the course of normal operation it may be necessary to stop a CPU to provide, for example, a low power state.

During a reset of the processor, the processor may access data corresponding to the file 111. One option to allow the processor access to the file 111, is to reload an image of the file 111 from the non-volatile memory to overwrite or restore the changed data values of the corresponding data in memory 121b. However this may increase the time taken to reset the processor.

In some embodiments of the present application, a second copy of at least a section of the file 111 may be stored in the memory 120 along with storing the image file 120 (or first copy) of the file 111 in the memory 120. It will be appreciated that in some embodiments, the second copy may be stored in a read only area of the memory 120. A copy of at least a section of the file 111 is shown at 122. In some embodiments, the copy 122 may correspond to the section of the image file 121 that is stored in the read and write accessible section of the memory 120.

It will be appreciated that the memory 120 will contain two copies of at least a section of the file 111, for example: a first copy (image file 121) of the file 111 and a duplicate copy (copy 122) of at least a section of the file 111. It will be appreciated that the duplicate copy (copy 122) may be a copy of file 111 or of the first copy (image file 121) as the initial values of the file 111 and first copy (image file 121) of the file 111 may be the same. The writable section of the copy of the file 111 (image file 121) may of course be changed during the execution of the processor.

When it is determined that the processor is to be reset, the copy 122 may be used to overwrite the corresponding section of the image file 121 that has become changed through the operation of the processor. This may restore that section of data in the image file 121 to its default values. The processor may then be reset from the image file 121 stored in the volatile memory without having to reload the image file from the file 111 in the non-volatile memory.

Figure 2:
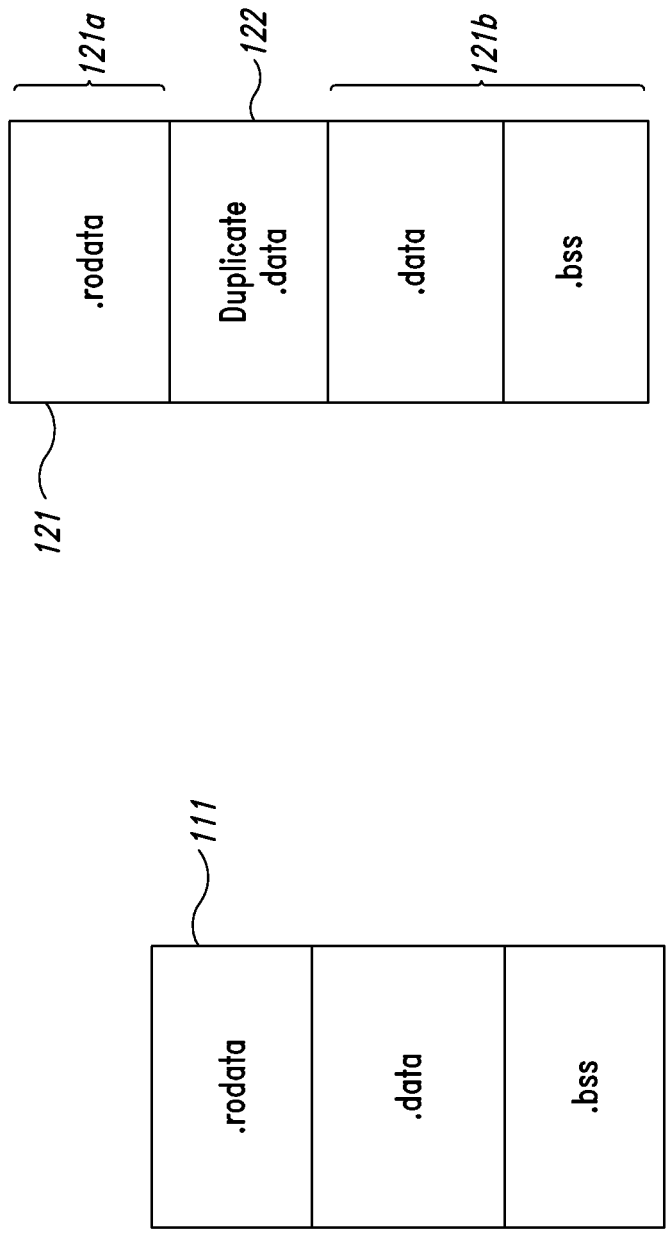
FIG. 2 shows an example of a file and an image file according to some embodiments.

FIG. 2 shows an example of the file 111 and image file 121 according to some embodiments. FIG. 2 shows an executable and linkable (ELF) file 111 and an image of the ELF file 121 including a copy of a section of the image 122.

The ELF file 111 includes a read-only data section (.rodata), a data section (.data) and a variables section (.bss). As described, the ELF file 111 may be copied to the volatile memory 120 for the processor to start executing. This image of the ELF file 121 is shown in FIG. 2.

The image 121 includes an image or copy of the .rodata, .data and .bss sections of the ELF file 111. The image 121 includes an additional copy of the .data section of the ELF file 111. The .rodata 121a and copy of the .data section 122 may be stored in a read-only section of the volatile memory 120 while the .data and .bss sections 121b may be stored in the read and write accessible area of the volatile memory 120. When the processor is reset, the duplicate .data section 122 may be used to initialize the .data section 121b.

Figure 3:
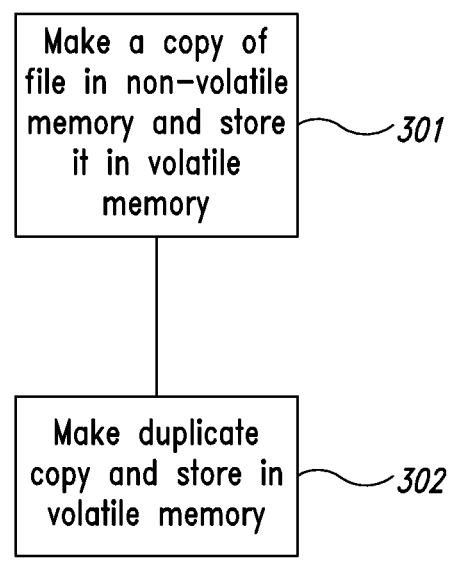
FIG. 3 is a flow diagram depicting the method steps carried out in accordance with an embodiment.

FIG. 3 shows an example of a method that may be carried out in accordance with embodiments.

At step 301 a copy of a file 111 is made and stored in the volatile memory 120 to form an image file. At step 302 a duplicate copy of at least a section of the file 111 is made and stored in a read only section of the volatile memory 120.

In some embodiments, the duplicate copy 122 may be made from the file 111 or the image file 121. It will be appreciated that at this point, the file 111 and image file 121 will be identical. It will also be appreciated that steps 301 and 302 need not be sequential but may be carried out for example concurrently.

Figure 4:
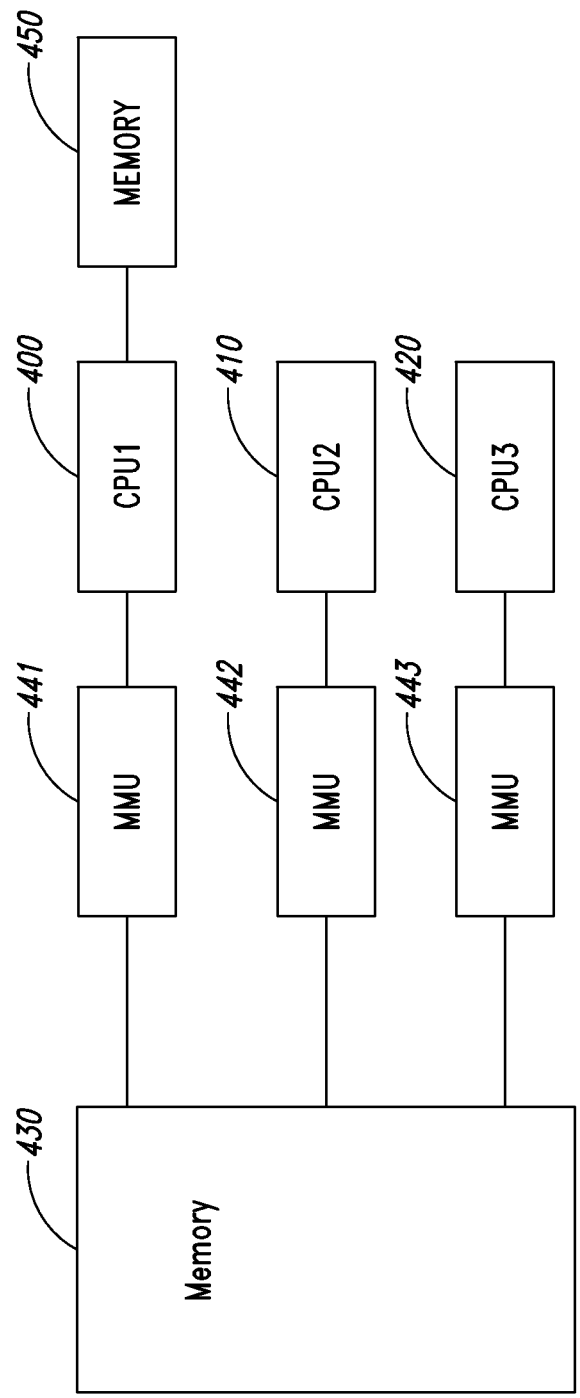
FIG. 4 shows an example of a multiprocessor system in which some embodiments may be implemented.

FIG. 4 shows an example implementation of an embodiment in a system comprising multiple processors. In this example the system comprises three processors. In some multiprocessor systems a memory space of a processor may become corrupted through for example another processor erroneously writing to that memory space.

The system of FIG. 4 comprises a first processor 400, a second processor 410 and a third processor 420. In some embodiments, the first processor 400 may be considered to be a host processor. The host processor may carry out some management functionality with respect to the system and the other processors. For example, the host processor may be configured to reset the other processors and handle potential errors in the system.

The first, second and third processors 400, 410 and 420 may access a system memory 430. The system memory 430 may be configured to store operating instructions and data information for the first, second and third processors 400, 410 and 420.

The first, second and third processors 400, 410 and 420 may access the memory 430 via respective memory management units (MMUs) 441, 442 and 443. It will be appreciated however that this is by way of example only and the memory access functionality may be provided by more or less units and/or provided by the processors themselves.

The system of FIG. 1 may further comprise a non-volatile memory 450. The non-volatile memory 450 may contain for example start-up instructions and start-up files for each of the processors 400, 410 and 420 of the multiprocessor system. The start-up files may contain instructions, for example operational code, and data information, for example initial data register values, for each processor. For example, in some embodiments, the start-up memory 450 may be a boot memory and may store boot files. In some embodiments this may correspond to the file 111 of FIG. 1.

It will be appreciated that the system of FIG. 1 is by way of example only and in some embodiments may contain a different number of processors, additional memories and other memory management functionality.

During a start-up of the system of FIG. 4, start-up files are copied into the system memory 430 from the non-volatile memory 450 and the system memory 430 may be mapped to the address spaces of the processors 400, 410, 420 to allow them memory access.

It will be appreciated that the start-up files may be copied to the system memory 430 in accordance with the embodiments as described with reference to FIGS. 1 to 3. In this example, system memory 430 may be mapped to the address space of the processors 400, 410, 420 in order to create a read only section of memory for the duplicate copy of the section of the file 121.

Figure 5:
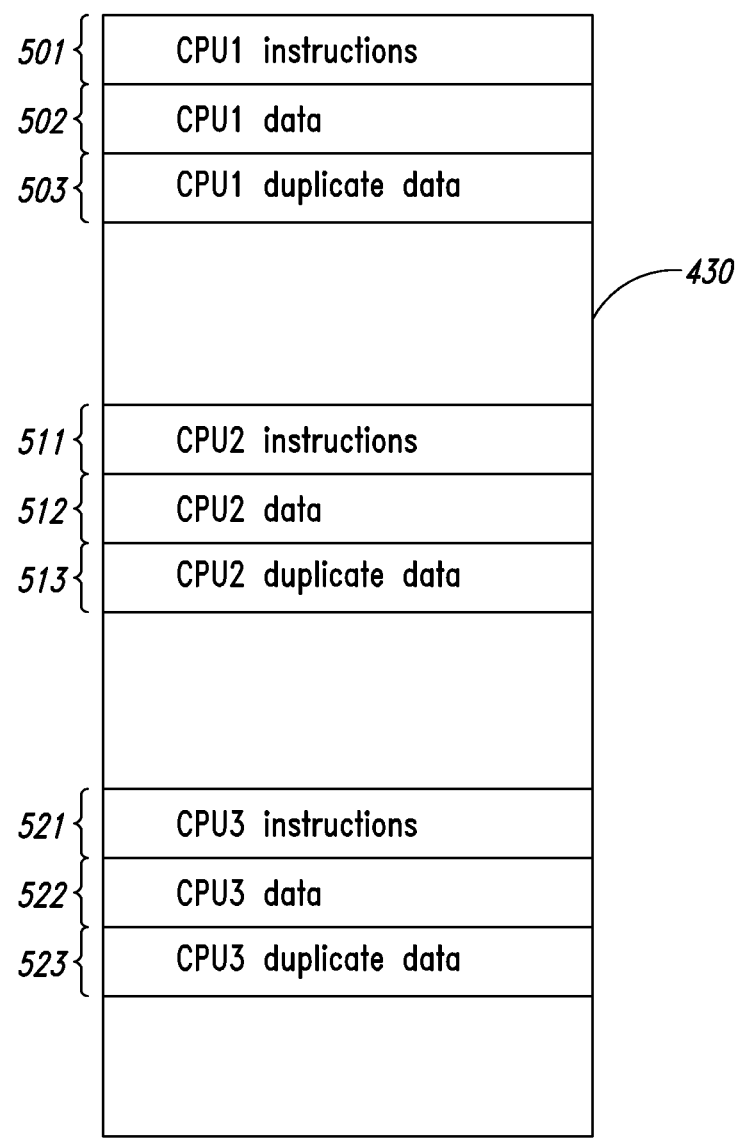
FIG. 5 shows an example of a data structure according to some embodiments.

FIG. 5 shows an example of the system memory 430 in accordance with an embodiment including duplicate data information for the multiprocessor system of FIG. 4.

The system memory 430 of FIG. 5 comprises operating instructions for the first processor 400 stored in section 501. Data information for the first processor 400, for example data register values, are stored in section 502 of the system memory 430. Additionally, a copy of at least part of the data section 502 is stored in the system memory 430 at section 503. Similarly, for the second processor 410, operating instructions are stored in section 511, data information is stored in section 512 and a copy of at least part of the data information at 512 is stored in section 513. For the third processor 420, operating instructions are stored in section 521, data information is stored in section 532 and a copy of at least part of the data information stored in section 532 is stored in section 532.

It will be appreciated that the respective sections 502, 512 and 522 storing data information for each processor may comprise a read only section and a read and write accessible section according to some embodiments.

In this manner, for example, the system memory 430 may store a duplicate or backup copy of at least part of the data information stored for a processor from the start-up file.

While the foregoing has described the duplicate data section 120 being stored in read only memory, it will be appreciated that this may be useful for embodiments where a reset of a processor will reset the processor to the initial default values of data. In other embodiments, the processor may be reset to a previous instruction at which the duplicate data section was last updated and known to be valid. In this case, the duplicate data section may be stored in read and write accessible memory.

It will be appreciated that in this embodiment, the sections of duplicate data information may be mapped as read and write accessible memory areas instead of read only.

Figure 6:
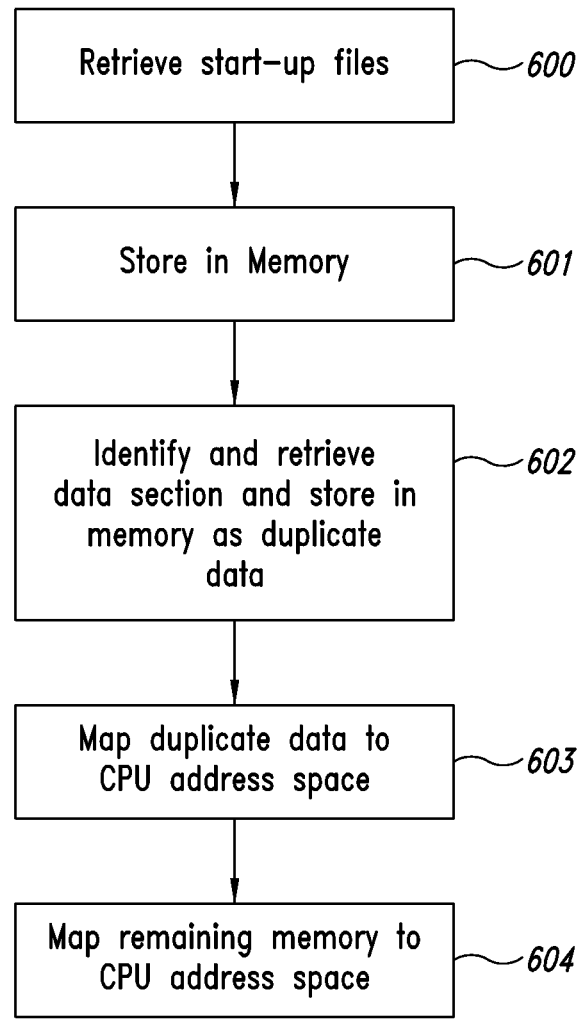
FIG. 6 is a flow diagram depicting the method steps according to an embodiment.

FIG. 6 shows an example of duplicate data sections 503, 513 and 523 being updated during run-time.

It will be appreciated that in embodiments a processor may be re-initialized from an image file stored in the volatile memory. However, in this case, instead of being re-initialized to an initial state (for example a start-up or boot state of data registers), the processor may be initialized to a later state of operation of the processor. For example, the processor may be reset to the last state (or instruction) at which the data register values were known to be correct or without error. The processor may for example do this by updating the data information in the image file periodically to reflect a known correct state corresponding to an instruction.

At step 600 start-up files are retrieved from the start-up memory 450 and stored in the system memory 430 at step 601.

At step 602, the host processor may identify a data information section in a start-up file for a processor in the start-up memory 450 and retrieve and store the data information section in the system memory in the duplicate data section.

At step 603, each of the duplicate data sections, for example sections 503, 513 and 523 of FIG. 5, may be mapped to the address space of the processor associated with that data information section. For example, the duplicate data section 503 may be mapped to the address space of the first processor 400, the duplicate data section 513 may be mapped to the address space of the second processor 410 and the duplicate data section 523 may be mapped to the address space of the third processor 420.

In this manner, a processor associated with that duplicate data section may access that duplicate data section, and the second and third processors 410 and 420 may not have access to the duplicate data section 503. Similarly the first and third processors 400 and 420 may not have access to the duplicate data section 523 and the first and third processors 400 and 420 may not have access to duplicate data section 513.

At step 604, the remaining memory is mapped to the address space of the processors. As discussed above the remaining memory may be mapped as read-only or read and write access memory.

In the embodiment of FIG. 6, the duplicate data may be mapped as read and write access memory, but only mapped to the address space of the processor concerned with that particular data. In this manner, the other processors are not able to erroneously overwrite the duplicate data section as they do not have access to that section of memory. At the same time, a duplicate data section is accessible to a processor with which that section is associated and so can be updated by that processor. In some embodiments a processor may, from time to time, update the duplicate data section with values of the data section. In this manner, if an error is detected, the processor may reset the data section to the last updated values rather than having to reset the entire system.

It will be appreciated that in some embodiments, the duplicate data section may be updated at set periods of time, in response to certain operations, in response to instruction from the host processor, when data registers in the data section are updated and/or at any relevant time.

In other embodiments, the duplicate data sections may be mapped to the address space of the host processor only and the host processor may control the updating of the duplicate data section on behalf of the other processors in the system.

While the foregoing has described examples of a single processor and multiprocessor system(s) according to some embodiments, it will be appreciated that certain changes or modifications may be obvious to a person skilled in the art and fall within the scope of this disclosure and the teachings herein are applicable to both systems.

For example while the system of FIG. 4 is exemplified as having three processors, it will be appreciated that more or less processors may be present. Additionally, while the start-up memory 450 has been shown as a separate memory to the system memory 430, it will be appreciated that the start-up memory may form a part of the system memory. It will also be appreciated that any suitable memory may be used as the system memory.

It will be appreciated that embodiments may be incorporated in different multiprocessor systems to that depicted. For example, embodiments may be incorporated in multimedia systems such as set-top boxes. Embodiments may also be implemented with a variety of processor types.

It will further be appreciated, that while embodiments have been disclosed as comprising multiple processors, some embodiments may include multiple processor cores which share other functionality of a processor. In some embodiments the system may be implemented on an integrated circuit and on a single die or more than one die.

It will further be appreciated that while the foregoing describes a processor being reset, it will be appreciated that programs, applications, thread and/or processes running on the processor may be reset.

It will also be appreciated that while the image file 121 has been exemplified as having executable and linkable file format, it will be appreciated that the file may be any file or data structure suitable for the boot-up or start-up of a processor, for example, an executable file.

It will further be appreciated that in the foregoing the terms central processing unit (CPU) and processor have been used interchangeably. Where these terms can be construed as having different meanings, it will be appreciated that the common functionality allows embodiments to be carried out on these devices.

It will also be appreciated that embodiments may be carried out on any apparatus or device as described herein. For example some embodiments may be implemented on a host processor, other processor and/or part of a system. It will also be appreciated that the apparatus or device may be configured to carry out any of the method steps described herein. It will also be appreciated that any data structure or computer program implementing embodiments may implement any of the method steps described herein.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   storing a plurality of files in a first memory, each file of the plurality of files being associated with a respective processor of a multiprocessor system;
   for each file of the plurality of files, storing a duplicate of at least a part of the file in the first memory; and
   selectively resetting a processor of the multiprocessor system based on the duplicate of at least a part of the file associated with the processor, wherein at least one of the plurality of files is an image of a processor boot-up file stored in a second memory, at least one of the plurality of files comprises data information and the data information is stored in a first section of the first memory, the duplicate of at least a part of the at least one of the plurality of files comprises duplicate data information and is stored in a second section of the first memory, and the second section of the first memory comprises read only memory.

2. The method of claim 1 wherein the data information stored in the first section of the first memory is configured to be modified during the operation of the associated processor.

3. The method of claim 1, comprising:
   updating the duplicate data information in the second section by overwriting the duplicate data information with the data information stored in the first section.

4. The method of claim 3 wherein the duplicate data information is overwritten periodically.

5. The method of claim 1 wherein the data information comprises data register values for a respective associated processor.

6. The method of claim 1 wherein the second memory is a non-volatile memory of the multiprocessor system.

7. The method of claim 1 wherein the at least part of the file associated with a respective processor is duplicated such that recovery is possible from the duplicate of the at least first part of the file when the at least first part of the file has become corrupted by operation of the associated processor.

8. The method of claim 1 wherein the duplicate of the at least part of the file associated with a respective processor is maintained in a valid state such that a system recovery may be based on the duplicate of the at least a part of the file.

9. The method of claim 1 wherein a processor of the multiprocessor system is reset from a volatile memory.

10. The method of claim 1 wherein a processor of the multiprocessor system manages access to sections of the first memory by processors of the multiprocessor system.

11. The method of claim 1, comprising restricting access to a section of the first memory storing a duplicate of at least a part of the file associated with a respective processor of the multiprocessor system to the associated processor.

12. A method, comprising:
   storing a plurality of files in a first memory, each file of the plurality of files being associated with a respective processor of a multiprocessor system;
   for each file of the plurality of files, storing a duplicate of at least a part of the file in the first memory; and
   selectively resetting a processor of the multiprocessor system based on the duplicate of at least a part of the file associated with the processor, wherein at least one of the plurality of files is an image of a processor boot-up file stored in a second memory, at least one of the plurality of files comprises data information and the data information is stored in a first section of the first memory, the data information stored in the first section of the first memory is configured to be modified during the operation of the associated processor, the method comprises updating the duplicate data information in the second section by overwriting the duplicate data information with the data information stored in the first section, and the duplicate data information is overwritten when it is determined that the data information in the first section has been modified without error.

13. The method of claim 12 wherein the duplicate of at least a part of the at least one of the plurality of files comprises duplicate data information and is stored in a second section of the first memory.

14. The method of claim 12 wherein the second section of the first memory comprises read only memory.

15. The method of claim 12 wherein the first memory is a volatile memory of the multiprocessor system.

16. The method of claim 12 wherein a processor of the multiprocessor system manages access to sections of the first memory by processors of the multiprocessor system.

17. The method of claim 12, comprising restricting access to a section of the first memory storing a duplicate of at least a part of the file associated with a respective processor of the multiprocessor system to the associated processor.

18. A method, comprising:
storing a plurality of files in a first memory, each file of the plurality of files being associated with a respective processor of a multiprocessor system;
for each file of the plurality of files, storing a duplicate of at least a part of the file in the first memory; and
selectively resetting a processor of the multiprocessor system based on the duplicate of at least a part of the file associated with the processor, wherein at least one of the plurality of files is an image of a processor boot-up file stored in a second memory, at least one of the plurality of files comprises data information and the data information is stored in a first section of the first memory, the duplicate of at least a part of the at least one of the plurality of files comprises duplicate data information and is stored in a second section of the first memory, and the method comprises:
determining that the first section of the first memory associated with a respective processor has been modified in error; and
resetting the associated processor based on the duplicate data information stored in the second section of the first memory.

19. The method of claim 18 wherein resetting the associated processor comprises:
overwriting the first section of the file with the data information stored in the second section; and
resetting the associated processor using the overwritten file.

20. The method of claim 18 wherein a processor of the multiprocessor system manages access to sections of the first memory by processors of the multiprocessor system.

21. The method of claim 18, comprising restricting access to a section of the first memory storing a duplicate of at least a part of the file associated with a respective processor of the multiprocessor system to the associated processor.

22. A system, comprising:
one or more memories; and
a plurality of processors, which, in operation:
store a plurality of files in the one or more memories, each file of the plurality of files being associated with a respective processor of the plurality of processors;
for each file of the plurality of files, store a duplicate of at least a part of the file in the one or more memories; and
selectively reset a processor of the plurality of processors based on the duplicate of at least a part of the file associated with the processor, wherein at least one of the plurality of files comprises data information and the data information is stored in a first section of a first volatile memory of the one or more memories and the duplicate of at least a part of the at least one of the plurality of files comprises duplicate data information and is stored in a second section of the first volatile memory, in operation, the data information stored in the first section of the first volatile memory is modified during the operation of the associated processor and the second section of the first volatile memory comprises read only memory.

23. The system of claim 22 wherein at least one of the plurality of files is an image of a processor boot-up file.

24. The system of claim 22 wherein, in operation, a processor of the plurality of processors manages access to sections of the one or more memories by processors of the plurality of processors.

25. The system of claim 22 wherein, in operation, access to a section of the one or more memories storing a duplicate of at least a part of the file associated with a respective processor of the plurality of processors is restricted to the associated processor.

26. The system of claim 22 wherein the one or more processors are processing cores of a network-on-a-chip.

27. A system, comprising:
one or more memories; and
a plurality of processors, which, in operation:
store a plurality of files in the one or more memories, each file of the plurality of files being associated with a respective processor of the plurality of processors;
for each file of the plurality of files, store a duplicate of at least a part of the file in the one or more memories; and
selectively reset a processor of the plurality of processors based on the duplicate of at least a part of the file associated with the processor, wherein at least one of the plurality of files comprises data information and the data information is stored in a first section of a first volatile memory of the one or more memories and the duplicate of at least a part of the at least one of the plurality of files comprises duplicate data information and is stored in a second section of the first volatile memory, and when it is determined that the first section of the first volatile memory associated with a respective processor has been modified in error, the associated processor is reset based on the duplicate data information stored in the second section of the first volatile memory.

28. The system of claim 27 wherein, in operation, the data information stored in the first section of the first volatile memory is modified during the operation of the associated processor.

29. The system of claim 28 wherein the second section of the first volatile memory comprises read only memory.

30. The system of claim 29 wherein, in operation, the duplicate data information in the second section is selectively overwritten with the data information stored in the first section.

31. The system of claim 27 wherein, in operation, a processor of the plurality of processors manages access to sections of the one or more memories by processors of the plurality of processors.

32. The system of claim 27 wherein, in operation, access to a section of the one or more memories storing a duplicate of at least a part of the file associated with a respective processor of the plurality of processors is restricted to the associated processor.

33. A non-transitory computer-readable medium containing contents which cause a multiprocessor system to perform a method, the method comprising:
   storing a plurality of files in one or more memories of the multiprocessor system, each file of the plurality of files being associated with a respective processor of the multiprocessor system;
   for each file of the plurality of files, storing a duplicate of at least a part of the file in the one or more memories; and
   selectively resetting a processor of the plurality of processors based on the duplicate of at least a part of the file associated with the processor, wherein at least one of the plurality of files comprises data information and the data information is stored in a first section of a first volatile memory of the one or more memories and the duplicate of at least a part of the at least one of the plurality of files comprises duplicate data information and is stored in a second section of the first volatile memory, the data information stored in the first section of the first volatile memory is modified during the operation of the associated processor and the second section of the first volatile memory comprises read only memory.

34. The medium of claim 33 wherein at least one of the plurality of files is an image of a processor boot-up file.

35. The medium of claim 33 wherein the method comprises managing access to sections of the one or more memories by processors of the multiprocessor system.

36. The medium of claim 35 wherein the managing access comprises restricting access to a section of the one or more memories storing a duplicate of at least a part of the file associated with a respective processor of the multiprocessor system to the associated processor.

37. A non-transitory computer-readable medium containing contents which cause a multiprocessor system to perform a method, the method comprising:
   storing a plurality of files in one or more memories of the multiprocessor system, each file of the plurality of files being associated with a respective processor of the multiprocessor system;
   for each file of the plurality of files, storing a duplicate of at least a part of the file in the one or more memories; and
   selectively resetting a processor of the plurality of processors based on the duplicate of at least a part of the file associated with the processor, wherein at least one of the plurality of files comprises data information and the data information is stored in a first section of a first volatile memory of the one or more memories and the duplicate of at least a part of the at least one of the plurality of files comprises duplicate data information and is stored in a second section of the first volatile memory, and when it is determined that the first section of the first volatile memory associated with a respective processor has been modified in error, the associated processor is reset based on the duplicate data information stored in the second section of the first volatile memory.

38. The medium of claim 37 wherein at least one of the plurality of files is an image of a processor boot-up file.

39. The medium of claim 37 wherein the method comprises managing access to sections of the one or more memories by processors of the multiprocessor system.

40. The medium of claim 39 wherein the managing access comprises restricting access to a section of the one or more memories storing a duplicate of at least a part of the file associated with a respective processor of the multiprocessor system to the associated processor.

* * * * *